United States Patent
Wei et al.

(10) Patent No.: US 9,678,737 B2
(45) Date of Patent: Jun. 13, 2017

(54) METHOD FOR DISTRIBUTING LARGE-SIZED LINUX SOFTWARE PACKAGES

(71) Applicant: G-CLOUD TECHNOLOGY LTD, Dongguan, Guangdong (CN)

(72) Inventors: Linlin Wei, Guangdong (CN); Zhanpeng Mo, Guangdong (CN); Song Yang, Guangdong (CN); Tongkai Ji, Guangdong (CN)

(73) Assignee: G-CLOUD TECHNOLOGY LTD, Dongguan, Guangdong (CN)

( * ) Notice: Subject to any disclaimer, the term of this patent is extended or adjusted under 35 U.S.C. 154(b) by 370 days.

(21) Appl. No.: 14/398,469

(22) PCT Filed: Feb. 10, 2014

(86) PCT No.: PCT/CN2014/071918
§ 371 (c)(1),
(2) Date: Nov. 2, 2014

(87) PCT Pub. No.: WO2015/039413
PCT Pub. Date: Mar. 26, 2015

(65) Prior Publication Data
US 2016/0283218 A1    Sep. 29, 2016

(30) Foreign Application Priority Data

Sep. 18, 2013 (CN) .......................... 2013 1 0430734

(51) Int. Cl.
*G06F 9/445* (2006.01)
*H04L 29/08* (2006.01)

(52) U.S. Cl.
CPC ................ *G06F 8/63* (2013.01); *H04L 67/34* (2013.01); *G06F 8/60* (2013.01); *G06F 8/61* (2013.01); *G06F 8/65* (2013.01)

(58) Field of Classification Search
CPC ..... G06F 8/60; G06F 8/61; G06F 8/63; G06F 8/65; G06F 9/445
See application file for complete search history.

(56) References Cited

U.S. PATENT DOCUMENTS

| | | | |
|---|---|---|---|
| 2007/0028230 A1* | 2/2007 | Goetz | G06F 8/61 717/174 |
| 2008/0127171 A1* | 5/2008 | Tarassov | G06F 8/60 717/174 |

(Continued)

OTHER PUBLICATIONS

Denis Silakov, "ABF: a farm for building cross-distribution Linux software", Oct. 2014, CEE-SECR'14, ACM, pp. 1-6; <http://dl.acm.org/citation.cfm?id=2687235&CFID=712243102&CFTOKEN=65052564>.*

(Continued)

*Primary Examiner* — Thuy Dao
*Assistant Examiner* — Ben C Wang

(57) ABSTRACT

A method for distributing large-sized Linux software packages, in a field of a Linux software distribution, includes steps of: installing a Linux minimal system; obtaining a log file of the installing, and setting a cache of a local download rpm; building an environment for creating iso, and creating a working directory; testing an environment dependency of a developed software and packaging into rpm packages, copying the downloaded rpm packages within the cache into the working directory, and registering; installing tools of createrpo and mkisofs for generating a disc; editing a kickstart file, ks.cfg; generating and modifying a comps.xml to designating the rpm packages and dependencies thereof which are required within a software archive of the system; generating an iso file of gcloud, and verifying with MD5 value. The method is applicable to a large-sized software package distribution by overcoming version verification and vulnerability to network.

20 Claims, 1 Drawing Sheet

(56) References Cited

U.S. PATENT DOCUMENTS

| | | | | |
|---|---|---|---|---|
| 2008/0270583 | A1* | 10/2008 | Gonzalez | G06F 8/61 709/222 |
| 2009/0204961 | A1* | 8/2009 | DeHaan | G06F 8/60 718/1 |
| 2009/0307684 | A1* | 12/2009 | Best | G06F 8/60 717/174 |
| 2010/0146094 | A1* | 6/2010 | Elkayam | G06F 17/30209 709/223 |
| 2011/0016299 | A1* | 1/2011 | Galicia | G06F 9/45537 713/1 |
| 2011/0093691 | A1* | 4/2011 | Galicia | G06F 9/441 713/2 |
| 2011/0107299 | A1* | 5/2011 | DeHaan | G06F 9/45533 717/121 |
| 2011/0131564 | A1* | 6/2011 | Vidal | G06F 8/65 717/174 |
| 2011/0131565 | A1* | 6/2011 | Vidal | G06F 8/65 717/175 |
| 2011/0131566 | A1* | 6/2011 | Vidal | G06F 8/65 717/175 |
| 2011/0173603 | A1* | 7/2011 | Nakamura | G06F 8/66 717/173 |
| 2012/0089971 | A1* | 4/2012 | Williams | G06F 8/61 717/167 |
| 2012/0144378 | A1* | 6/2012 | Shah | G06F 8/60 717/170 |
| 2012/0185499 | A1* | 7/2012 | Alpern | G06F 9/45558 707/769 |
| 2013/0031542 | A1* | 1/2013 | Arcilla | G06F 9/44505 717/177 |
| 2014/0229939 | A1* | 8/2014 | Dias de Assuncao | G06F 8/63 718/1 |
| 2015/0186124 | A1* | 7/2015 | Hoy | G06F 8/61 726/22 |
| 2016/0246583 | A1* | 8/2016 | Kolesnik | G06F 8/61 |

OTHER PUBLICATIONS

Mongkolluksame et al., "A management system for software package distribution", Jul. 2012, PICMET'12, IEEE, pp. 3529-3536; <http://ieeexplore.ieee.org/stamp/stamp.jsp?arnumber=6304372>.*

Abate et al., "MPM: A Modular Package Manager", ACM, Jun. 2011, CBSE'11, pp. 179-187; <http://dl.acm.org/citation.cfm?id=2000255&CFID=724963312&CFTOKEN=49908530>.*

Mongkolluksame et al., "A Management System for Software Package Distribution", IEEE, Aug. 2012, PICMET'12, pp. 3529-3536; <http://ieeexplore.ieee.org/stamp/stamp.jsp?tp=&arnumber=6304372>.*

Jeszenszky, "Web Ontology for Software Package Management", Jan. 2010, ICAI2010, pp. 331-338; <http://icai.ektf.hu/pdf/ICAI2010-vol2-pp331-338.pdf>.*

* cited by examiner

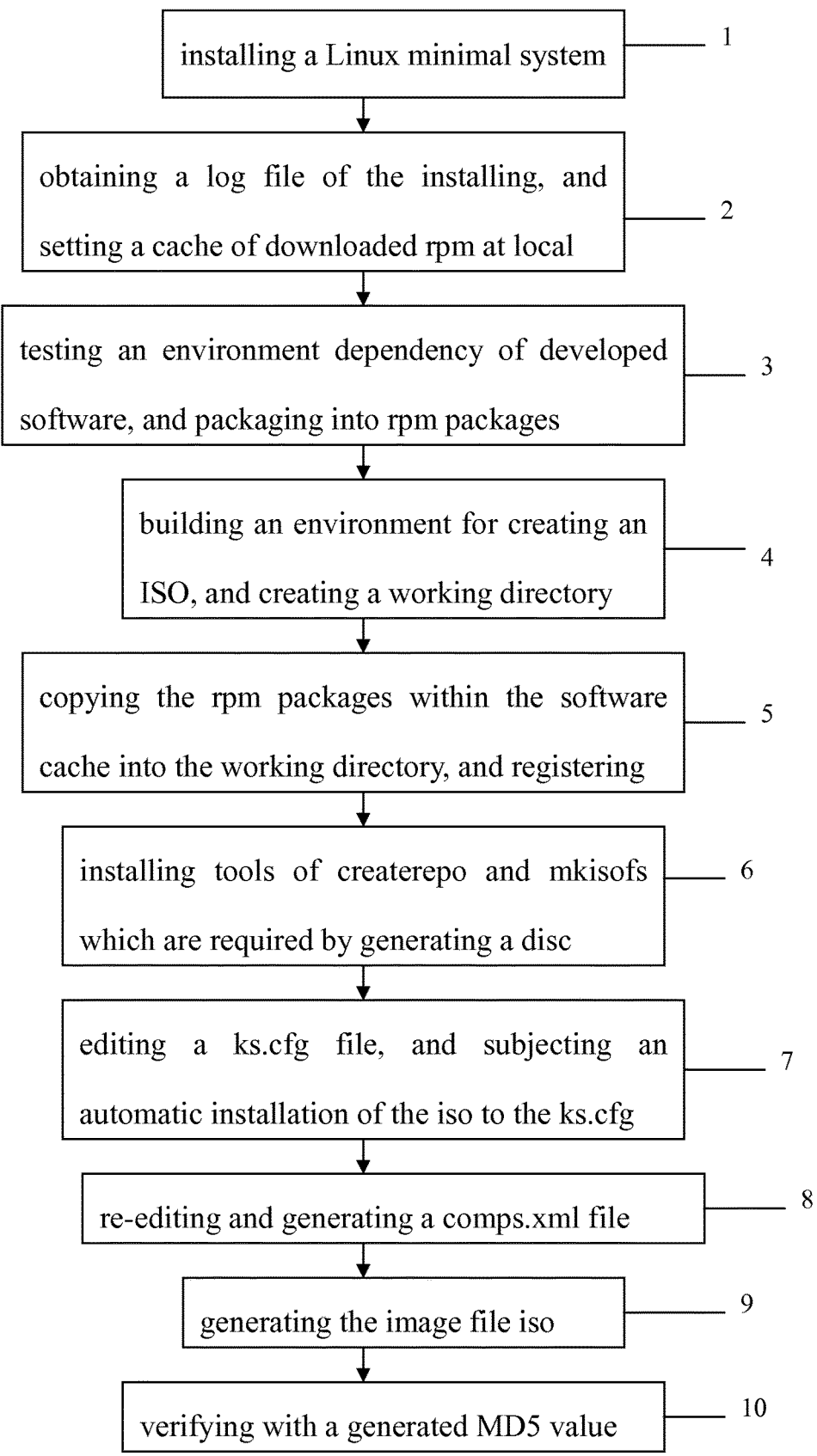

METHOD FOR DISTRIBUTING LARGE-SIZED LINUX SOFTWARE PACKAGES

CROSS REFERENCE OF RELATED APPLICATION

This is a U.S. National Stage under 35 U.S.C 371 of the International Application PCT/CN2014/071918, filed Feb. 10, 2014, which claims priority under 35 U.S.C. 119(a-d) to CN 201310430734.9, filed Sep. 18, 2013.

BACKGROUND OF THE PRESENT INVENTION

Field of Invention

The present invention relates to a distribution of Linux software, and more particularly to a method for distributing large-sized Linux software packages.

Description of Related Arts

The large-sized Linux software is characterized in the long installation time and the multiple software dependencies. The conventional distribution of the large-sized Linux software is carried by the rpm (Red Hat Package Manager) and deb (Debian) software packages along with the profiles illustrating the installation of the dependency software, the post-installation verification method and etc.

However, the conventional distribution method of the above large-sized Linux software has following disadvantages.

Firstly, it consumes much work to become native to different Linux versions. When the large-sized Linux is developed based on a certain version, the Linux kernel and system software on which the large-sized Linux depends may be merely native to the certain version; it may require a search for the substitute version before being native to other Linux versions, as well as tests about compatibility and stability on the substitute version.

Secondly, the conventional distribution method usually excludes any direct download of the dependency packages. The users usually have to download the correspondent software from the Linux package source with yum (Yellow dog Updater, Modified) or apt (Advanced Packaging Tools) through the illustration of the profile. On one hand, the conventional distribution method depends on the network to download; the software can not be installed without the connection to the Internet or Intranet to create the local source. On the other hand, the yum and the apt only download the latest version of the dependency software as a default, and herein the downloaded dependency may be insufficient for the large-sized Linux software.

Thirdly, the software distributed in forms of the rpm or deb software packages involves no data integrity checking mechanism, and thus during the distribution, the software package is exposed to potential tampering which threats the data security.

In order to improve the deployment efficiency of the software, expedite the deployment and enhance the software stability during deploying, a disc image system for pre-customizing a software package distribution is needed to accomplish a stable and quick installation manner by installing the disc.

SUMMARY OF THE PRESENT INVENTION

An object of the present invention is to provide a method for distributing large-sized Linux software packages, which solves version verifications of a great number of rpm packages, and downloads of the rpm packages and related package dependencies without network, so as to securely and stably deploy software development; and which also reduces instability caused by data loss or an installation of incompatible rpm package.

Accordingly, in order to accomplish the above objects, the present invention provides a method for distributing large-sized Linux software packages, comprising steps of:

(1) providing an original version of a Linux installation disc for a Linux large-sized software development environment, and installing a Linux minimal system on a server;

(2) after the minimal system is installed, obtaining a log file of the installing, wherein the log file comprises a list of packages which the system has installed;

(3) setting a rpm or deb tool in the system to save a cache of downloaded software;

(4) building an environment for creating an ISO, creating a working directory of the creating, and copying files of the original disc, except the packages, into the working directory;

(5) installing a dependency environment of the Linux large-sized software in the system; verifying whether the dependency environment is right or not by installing packages of the Linux large-sized software, until the Linux large-sized software begins to run properly;

(6) copying a cache of a dependency software under a system software cache directory onto the working directory;

(7) installing tools of createrrepo and mkisofs which are required by generating a new disc;

(8) editing a ks.cfg file, and subjecting an automatic installation of an iso system to ks.cfg;

(9) re-generating an xml profile, namely a comps.xml file, of the packages under the working directory, and re-editing the comps.xml file according to practical needs;

(10) generating the image file iso; and

(11) generating a message-digest algorithm 5 (MD5) checkcode.

The minimal system comprises kernel packages and the packages on which the large-sized Linux software depends, contained in the Linux installation disc; other application software or desktop system are optional and unnecessary.

The log file, after installing, is a/root/install.log file. The install.log file which contains the packages installed within the minimal system obtains the list of the installed packages by commanding:

awk '/Installing/{print $2}' install.log|sed 's/^[0-9]*://g'>/root/packages.list, imports the list into a local file, and finally transfers the installed rpm packages into the working directory according to the list.

The step of "setting the rpm tool in the system to save the cache of the downloaded software" comprises enabling an option of saving cache in a/etc/yum.conf configuration file of the Linux system, and then caching the downloaded rpm packages in a directory of /var/cache/yum/x86_64/6/.

The step of "re-generating the comps.xml profile" comprises steps of: synchronizing all files of the disc into the working directory, generating the correspondent comps.xml in a /repodata/ directory under the working directory, wherein the comps.xml is generated by commanding: createrepo -g repodata/*-comps.xml /data/OS/ -- --simple-md-filenames; and customizing dependencies between components of the comps.xml and the rpm packages.

The dependency environment of the Linux large-sized software comprises: the packages on which a running of the installed software depends and archive files related to the dependencies, which further are the rpm packages and the dependencies thereof required by a running of developed software after being compiled. The rpm packages are related packages within yum install of the minimal system, required by the running of the software. A list of related dependencies is recorded, and the dependencies are added into the comps.xml file; the correspondent rpm in the directory of /var/cache/yum/x86_64/6/is copied under /packages/ of the working directory; and, names of the correspondent rpm are added into a list file of TRANS.TBL under /packages/.

By pre-customizing the disc image system of the software package distribution and installing the disc to accomplish the stable and quick installation, the present invention improves an efficiency of software deployment, expedites the deployment and enhances a stability of the software during deploying. In the meantime, the present invention reduces time spent on creating required software or required related dependency archive files on the software-running environment.

BRIEF DESCRIPTION OF THE DRAWINGS

The present invention will become apparent from the accompanying drawings.

The FIGURE is a flow chart of a method for distributing large-sized Linux software packages according to a preferred embodiment of the present invention.

DETAILED DESCRIPTION OF THE PREFERRED EMBODIMENT

Referring to the FIGURE, according to a preferred embodiment of the present invention, a method for distributing large-sized Linux software packages comprises steps of:

```
firstly, creating a working directory for creating a system:
    (1) mkdir -p /mnt/cdrom
    (2) mkdir -p /data/OS
    (3) mount /dev/cdrom /mnt/cdrom
    (4) sync -a --exclude=Packages /mnt/cdrom /data/OS
    (5) mkdir /data/OS/Packages;
    secondly, copying reduced rpm into a correspondent directory with following
edited scripts:
    #!/bin/bash
      DEBUG=0
      CentOS_DVD=/mnt/cdrom
      ALL_RPMS_DIR=/mnt/cdrom/Packages #source disc RPM package
storage directory
      KOS_RPMS_DIR=/data/OS/Packages  #reduced RPM package storage
directory
      packages_list=/root/packages.list #list of reduced RPM packages
      number_of_packages=`cat $packages_list | wc -1` #obtain package number
      i=1
      while [ $i -le $number_of_packages ] ; do
        line=`head -n $i $packages_list | tail -n -1`
        name=`echo $line | awk '{print $1}'`
        version=`echo $line | awk '{print $3}' | cut -f 2 -d :`
      if [ $DEBUG -eq "1" ] ; then
        echo $i: $line
        echo $name
        echo $version
      fi
      if [ $DEBUG -eq "1" ] ; then
        ls $ALL_RPMS_DIR/$name-$version*
      if [ $? -ne 0 ] ; then
        echo "cp $ALL_RPMS_DIR/$name-$version* "
      fi
      else
        echo "cp $ALL_RPMS_DIR/$name-$version* $KOS_RPMS_DIR/"
           cp $ALL_RPMS_DIR/$name-$version* $KOS_RPMS_DIR/ #copying
required package
           # in case the copy failed
           if [ $? -ne 0 ] ; then
             echo "cp $ALL_RPMS_DIR/$name-$version* "
             cp $ALL_RPMS_DIR/$name* $KOS_RPMS_DIR/
           fi
        fi
        i=`expr $i + 1`
      done;
    thirdly, installing required practical tools:
    yum -y install createrepo mkisofs;
    fourthly, generating a comps.xml file:
    cd /data/OS
      createrepo -g repodata/*-comps.xml /data/OS/ -- --simple-md-filenames;
    fifthly, adding and reducing related dependencies according to the comps.xml
file, and creating the related dependencies of gcloud;
    sixthly, editing a ks.cfg file whose content is:
    cp /root/anaconda-ks.cfg /data/OS/isolinux/ks.cfg
    Vi /data/OS/isolinux/ks.cfg
    firewall --disabled
    install
```

```
cdrom
rootpw --iscrypted $1$2nKbKr9J$sjwbbe62.txKtSLTKRyp1/
auth --useshadow --passalgo=sha512
text
keyboard us
lang en_US
selinux --disabled
skipx
logging --level=info
reboot --eject
timezone Asia/Shanghai
bootloader --location=mbr
zerombr
clearpart --all --initlabel
part /boot --fstype="ext4" --size=256
part swap --fstype="swap" --size=16000
part / --fstype="ext4" --size=20000
%post
/etc/init.d/gtunneld start
/etc/init.d/iptables stop
chkconfig iptables off
chkconfig cgconfig on
chkconfig gtunneld on
mkdir /instances
mkdir /sharefiles
ulimit -c unlimited
echo "/usr/local/lib">>/etc/ld.so.conf
echo "ldconfig /usr/local/lib">>/etc/rc.local
echo "GcloudOS Linux release 6.1 (Based on CentOS 6.4)" > /etc/centos-release
sed -i 's/CentOS release 6.4 (Final)/GcloudOS Linux release 6.1 (Based on CentOS 6.4)/g' /etc/issue
sed -i 's/CentOS release 6.4 (Final)/GcloudOS Linux release 6.1 (Based on CentOS 6.4)/g' /etc/issue.net
sed -i 's/localhost.localdomain/GcloudOS/g' /etc/sysconfig/network
sed -i 's/CentOS/GcloudOS/g' /etc/rc.d/rc.sysinit
sed -i 's/rhgb/ /g' /boot/grub/grub.conf
sed -i "s/enforcing/disabled/g" /etc/selinux/config
sed -i "/unix_sock_group/ s/#unix_sock_group/unix_sock_group/g" /etc/libvirt/libvirtd.conf
sed -i "/unix_sock_group/ s/libvirt/root/g" /etc/libvirt/libvirtd.conf
sed -i "/unix_sock_rw_perms/ s/#unix_sock_rw_perms/unix_sock_rw_perms/g" /etc/libvirt/libvirtd.conf
sed -i "/unix_sock_ro_perms/ s/#unix_sock_ro_perms/unix_sock_ro_perms/g" /etc/libvirt/libvirtd.conf
sed -i "/unix_sock_rw_perms/ s/0770/0777/g" /etc/libvirt/libvirtd.conf
sed -i "/security_driver/ s/#security_driver/security_driver/g" /etc/libvirt/qemu.conf
sed -i "/security_driver/ s#selinux#none#g" /etc/libvirt/qemu.conf
sed -i "/#user/ s/#user/user/g" /etc/libvirt/qemu.conf
sed -i "/#group/ s/#group/user/g" /etc/libvirt/qemu.conf
/etc/init.d/libvirtd restart
%end
%packages
@base;
seventhly, configuring the system to initiate from ks.cfg:
vi /data/OS/isolinux/isolinux.cfg
  default auto
  label auto
  kernel vmlinuz
  append ks=cdrom:/isolinux/kerry.cfg initrd=initrd.img;
eighthly, creating an iso of the system:
mkisofs -R -J -T -r -1 -d -joliet-long -allow-multidot -allow-leading-dots -no-bak -o /data/Gcloud-6.1-r009-20-ks-all-noPP-100G-x86_64.iso -b isolinux/isolinux.bin -c isolinux/boot.cat -no-emul-boot -boot-load-size 4 -boot-info-table /data/OS; and
finally, generating a MD5 checkcode to finish a system disc of GCLOUD as follows.
/usr/bin/implantisomd5 /data/Gcloud-6.1-r009-20-ks-all-noPP-100G-x86_64.iso
```

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A processor-executed method for distributing large-sized Linux software packages, comprising steps of:
   (1) providing an original version of a Linux installation disc for a Linux large-sized software development environment, and installing a Linux minimal system on a server;
   (2) after the Linux minimal system is installed, obtaining a log file of the installing, wherein the log file comprises a list of packages which the Linux minimal system has installed;
   (3) setting a rpm (Red Hat Package Manager) or deb (Debian) tool in the Linux minimal system to save a cache of downloaded software;
   (4) building an environment for creating an iso (isolation), creating a working directory of the creating, and copying files of the original disc, except the packages, into the working directory;
   (5) installing a dependency environment of the Linux large-sized software in the Linux minimal system; verifying whether the dependency environment is right or not by installing packages of the Linux large-sized software, until the Linux large-sized software begins to run properly;
   (6) copying a cache of a dependency software under a system software cache directory onto the working directory;
   (7) installing tools of createrrepo and mkisofs which are required by generating a new disc;
   (8) editing a ks.cfg file, and subjecting an automatic installation of an iso system to ks.cfg;
   (9) re-generating an xml (Extensible Markup Language) profile, namely a comps.xml file, of the packages under the working directory, and re-editing the comps.xml file according to practical needs;
   (10) generating the image file iso; and
   (11) generating a message-digest algorithm 5 (MD5) check code.

2. The method, as recited in claim 1, wherein the Linux minimal system kernel packages and the packages on which the large-sized Linux software depends, contained in the Linux installation disc, excluding other application software or desktop system.

3. The method, as recited in claim 2, wherein the log file, after installing, is a /root/install.log file; the install.log file contains the packages installed within the Linux minimal system, obtains the list of the installed packages by commanding:
   awk '/Installing/{print $2}' install.log|sed 's/^[0-9]*://g'>/root/packages.list,
   imports the list into a local file, and finally transfers the installed rpm packages into the working directory according to the list.

4. The method, as recited in claim 3, wherein the step of "setting the rpm tool in the Linux minimal system to save the cache of the downloaded software" comprises steps of: enabling an option of saving cache in a /etc/yum.conf configuration file of the Linux minimal system, and then caching the downloaded rpm packages in a directory of /var/cache/yum/x86_64/6/.

5. The method, as recited in claim 4, wherein the step of "re-generating the comps.xml profile" comprises steps of: synchronizing all files of the disc into the working directory, generating the correspondent comps.xml in a /repodata/ directory under the working directory, wherein the comps.xml is generated by commanding: createrepo -g repodata/*-comps.xml/data/OS/ -- --simple-md-filenames; and customizing dependencies between components of the comps.xml and the rpm packages.

6. The method, as recited in claim 4, wherein the dependency environment of the Linux large-sized software comprises: the packages on which a running of the installed software depends and archive files related to the dependencies, which further are the rpm packages and the dependencies thereof required by a running of developed software after being compiled; the rpm packages are related packages within yum install of the Linux minimal system, required by the running of the software; a list of related dependencies is recorded, and the dependencies are added into the comps.xml file; the correspondent rpm in the directory of /var/cache/yum/x86_64/6/is copied under /packages/ of the working directory; and, names of the correspondent rpm are added into a list file of TRANS.TBL under /packages/.

7. The method, as recited in claim 3, wherein the step of "re-generating the comps.xml profile" comprises steps of: synchronizing all files of the disc into the working directory, generating the correspondent comps.xml in a /repodata/ directory under the working directory, wherein the comps.xml is generated by commanding: createrepo -g repodata/*-comps.xml/data/OS/ -- --simple-md-filenames; and customizing dependencies between components of the comps.xml and the rpm packages.

8. The method, as recited in claim 7, wherein the dependency environment of the Linux large-sized software comprises: the packages on which a running of the installed software depends and archive files related to the dependencies, which further are the rpm packages and the dependencies thereof required by a running of developed software after being compiled; the rpm packages are related packages within yum install of the Linux minimal system, required by the running of the software; a list of related dependencies is recorded, and the dependencies are added into the comps.xml file; the correspondent rpm in the directory of /var/cache/yum/x86_64/6/is copied under /packages/ of the working directory; and, names of the correspondent rpm are added into a list file of TRANS.TBL under /packages/.

9. The method, as recited in claim 3, wherein the dependency environment of the Linux large-sized software comprises: the packages on which a running of the installed software depends and archive files related to the dependencies, which further are the rpm packages and the dependencies thereof required by a running of developed software after being compiled; the rpm packages are related packages within yum install of the Linux minimal system, required by the running of the software; a list of related dependencies is recorded, and the dependencies are added into the comps.xml file; the correspondent rpm in the directory of /var/cache/yum/x86_64/6/is copied under /packages/ of the working directory; and, names of the correspondent rpm are added into a list file of TRANS.TBL under /packages/.

10. The method, as recited in claim 2, wherein the step of "setting the rpm tool in the Linux minimal system to save the cache of the downloaded software" comprises steps of: enabling an option of saving cache in a /etc/yum.conf configuration file of the Linux minimal system, and then caching the downloaded rpm packages in a directory of /var/cache/yum/x86_64/6/.

11. The method, as recited in claim 10, wherein the step of "re-generating the comps.xml profile" comprises steps of: synchronizing all files of the disc into the working directory, generating the correspondent comps.xml in a /repodata/ directory under the working directory, wherein the comps.xml is generated by commanding: createrepo -g repodata/*-comps.xml/data/OS/ -- --simple-md-filenames; and customizing dependencies between components of the comps.xml and the rpm packages.

12. The method, as recited in claim 2, wherein the step of "re-generating the comps.xml profile" comprises steps of: synchronizing all files of the disc into the working directory, generating the correspondent comps.xml in a /repodata/ directory under the working directory, wherein the comps.xml is generated by commanding: createrepo -g repodata/*-comps.xml/data/OS/ -- --simple-md-filenames; and customizing dependencies between components of the comps.xml and the rpm packages.

13. The method, as recited in claim 1, wherein the log file, after installing, is a/root/install.log file; the install.log file contains the packages installed within the Linux minimal system, obtains the list of the installed packages by commanding:
awk '/Installing/{print $2}' install.log|sed 's/^[0-9]*://g'>/root/packages.list,
imports the list into a local file, and finally transfers the installed rpm packages into the working directory according to the list.

14. The method, as recited in claim 13, wherein the step of "setting the rpm tool in the Linux minimal system to save the cache of the downloaded software" comprises steps of: enabling an option of saving cache in a /etc/yum.conf configuration file of the Linux minimal system, and then caching the downloaded rpm packages in a directory of /var/cache/yum/x86_64/6/.

15. The method, as recited in claim 14, wherein the step of "re-generating the comps.xml profile" comprises steps of: synchronizing all files of the disc into the working directory, generating the correspondent comps.xml in a /repodata/ directory under the working directory, wherein the comps.xml is generated by commanding: createrepo -g repodata/*-comps.xml/data/OS/ -- --simple-md-filenames; and customizing dependencies between components of the comps.xml and the rpm packages.

16. The method, as recited in claim 13, wherein the step of "re-generating the comps.xml profile" comprises steps of: synchronizing all files of the disc into the working directory, generating the correspondent comps.xml in a /repodata/ directory under the working directory, wherein the comps.xml is generated by commanding: createrepo -g repodata/*-comps.xml/data/OS/ -- --simple-md-filenames; and customizing dependencies between components of the comps.xml and the rpm packages.

17. The method, as recited in claim 1, wherein the step of "setting the rpm tool in the Linux minimal system to save the cache of the downloaded software" comprises steps of: enabling an option of saving cache in a /etc/yum.conf configuration file of the Linux minimal system, and then caching the downloaded rpm packages in a directory of /var/cache/yum/x86_64/6/.

18. The method, as recited in claim 17, wherein the step of "re-generating the comps.xml profile" comprises steps of: synchronizing all files of the disc into the working directory, generating the correspondent comps.xml in a /repodata/ directory under the working directory, wherein the comps.xml is generated by commanding: createrepo -g repodata/*-comps.xml/data/OS/ -- --simple-md-filenames; and customizing dependencies between components of the comps.xml and the rpm packages.

19. The method, as recited in claim 1, wherein the step of "re-generating the comps.xml profile" comprises steps of: synchronizing all files of the disc into the working directory, generating the correspondent comps.xml in a /repodata/ directory under the working directory, wherein the comps.xml is generated by commanding: createrepo -g repodata/*-comps.xml/data/OS/ -- --simple-md-filenames; and customizing dependencies between components of the comps.xml and the rpm packages.

20. The method, as recited in claim 1, wherein the dependency environment of the Linux large-sized software comprises: the packages on which a running of the installed software depends and archive files related to the dependencies, which further are the rpm packages and the dependencies thereof required by a running of developed software after being compiled; the rpm packages are related packages within yum install of the Linux minimal system, required by the running of the software; a list of related dependencies is recorded, and the dependencies are added into the comps.xml file; the correspondent rpm in the directory of /var/cache/yum/x86_64/6/is copied under /packages/ of the working directory; and, names of the correspondent rpm are added into a list file of TRANS.TBL under /packages/.

* * * * *